(12) United States Patent
Halpin

(10) Patent No.: US 8,223,030 B2
(45) Date of Patent: Jul. 17, 2012

(54) COMPUTER DEVICE OUTPUT SETTING INDICATOR

(75) Inventor: Peter J. Halpin, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/156,796

(22) Filed: Jun. 9, 2011

(65) Prior Publication Data

US 2011/0238867 A1    Sep. 29, 2011

Related U.S. Application Data

(63) Continuation of application No. 11/261,868, filed on Oct. 28, 2005, now Pat. No. 8,004,417.

(51) Int. Cl.
*G08B 21/00* (2006.01)
*G06F 3/00* (2006.01)
*G06F 13/00* (2006.01)
*G06F 13/14* (2006.01)
*G06F 12/00* (2006.01)
*H04R 29/00* (2006.01)

(52) U.S. Cl. .............. 340/635; 710/8; 710/15; 710/100; 710/305; 711/100; 381/58

(58) Field of Classification Search .................. 340/635; 710/8
See application file for complete search history.

(56) References Cited

U.S. PATENT DOCUMENTS

| 6,832,271 | B1* | 12/2004 | Ivan et al. | 710/15 |
| 2002/0108010 | A1* | 8/2002 | Kahler et al. | 710/305 |
| 2004/0015629 | A1* | 1/2004 | Inui et al. | 710/300 |
| 2004/0101144 | A1* | 5/2004 | Lee | 381/58 |
| 2006/0044148 | A1* | 3/2006 | Daniels et al. | 340/686.1 |
| 2006/0155914 | A1* | 7/2006 | Jobs et al. | 711/100 |
| 2006/0206643 | A1* | 9/2006 | Tran et al. | 710/100 |

* cited by examiner

*Primary Examiner* — George Bugg
*Assistant Examiner* — Jack Wang

(57) ABSTRACT

A computer device comprises an output monitor configured to determine an output configuration setting for the computer device and automatically actuate an output setting indicator corresponding to the output configuration setting.

11 Claims, 3 Drawing Sheets

COMPUTER DEVICE OUTPUT SETTING INDICATOR

CROSS-REFERENCE TO RELATED APPLICATIONS

This application is a continuation of U.S. Ser. No. 11/261,868 filed on 28 Oct. 2005, now U.S. Pat. No. 8,004,417, which is incorporated herein by reference.

BACKGROUND OF THE INVENTION

Computer devices, such as desktop computers or notebook computers, comprise connector ports to enable attachment of external devices to the computer (e.g., projectors, monitors, disk drives, etc.) For example, to display a presentation running on the computer to a wide audience, an external projector is couplable to the computer through a connector port of the computer. However, delays in booting of the external device, delays in data transfer to the external device and/or other reasons may give a user the impression that there is a problem, either with the computer or the external device. In response, the user oftentimes cycles through numerous output settings of the presentation application (e.g., an internal setting where output is displayed only on the screen of the computer, an external setting where the output is displayed only on the projector and/or a hybrid setting where the output is displayed on both the computer and the projector) in an attempt to resolve the issue, which is time consuming and frustrating to the user.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
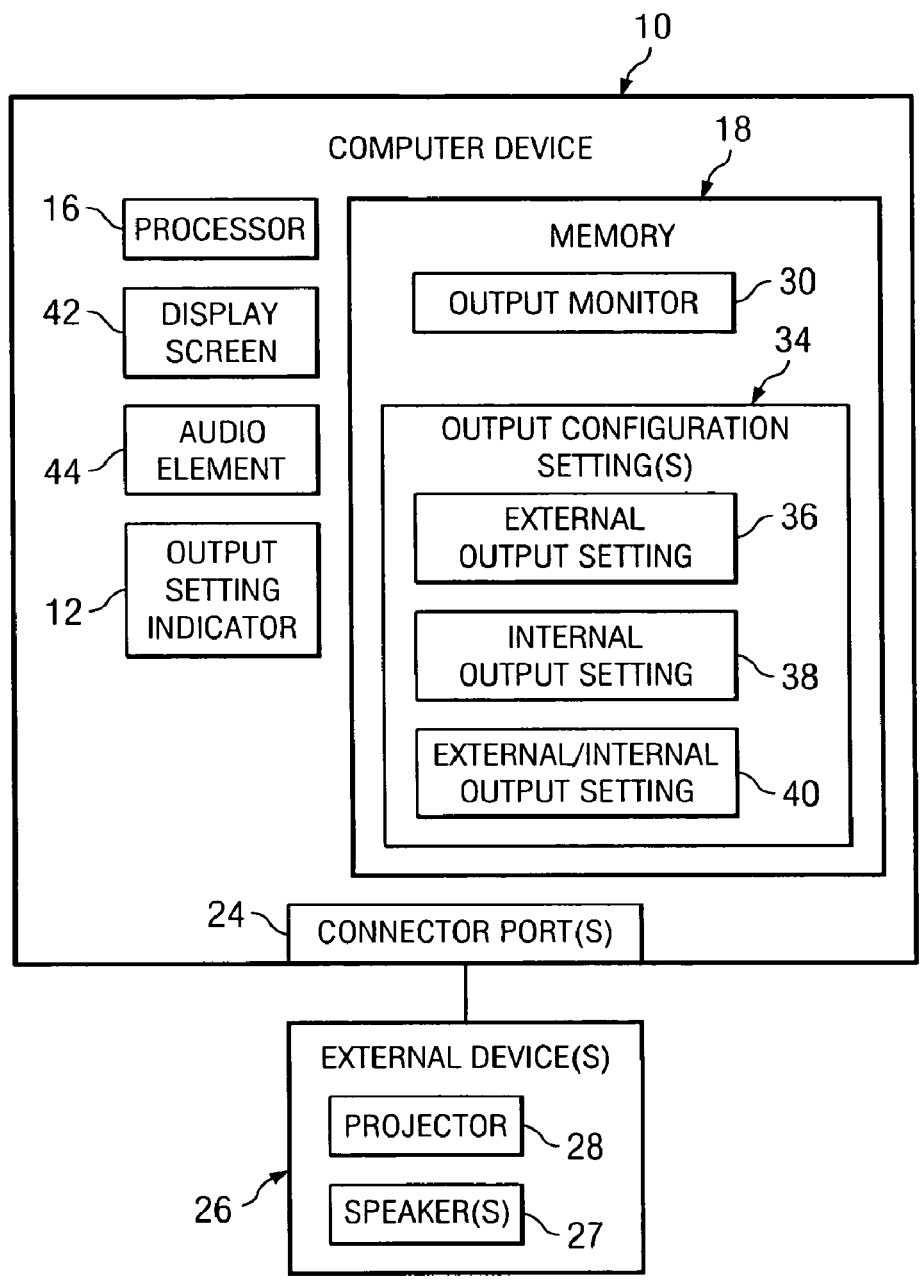
FIG. 1 is a block diagram illustrating an embodiment of a computer device having an output setting indicator in accordance with the present invention.
Figure 2:
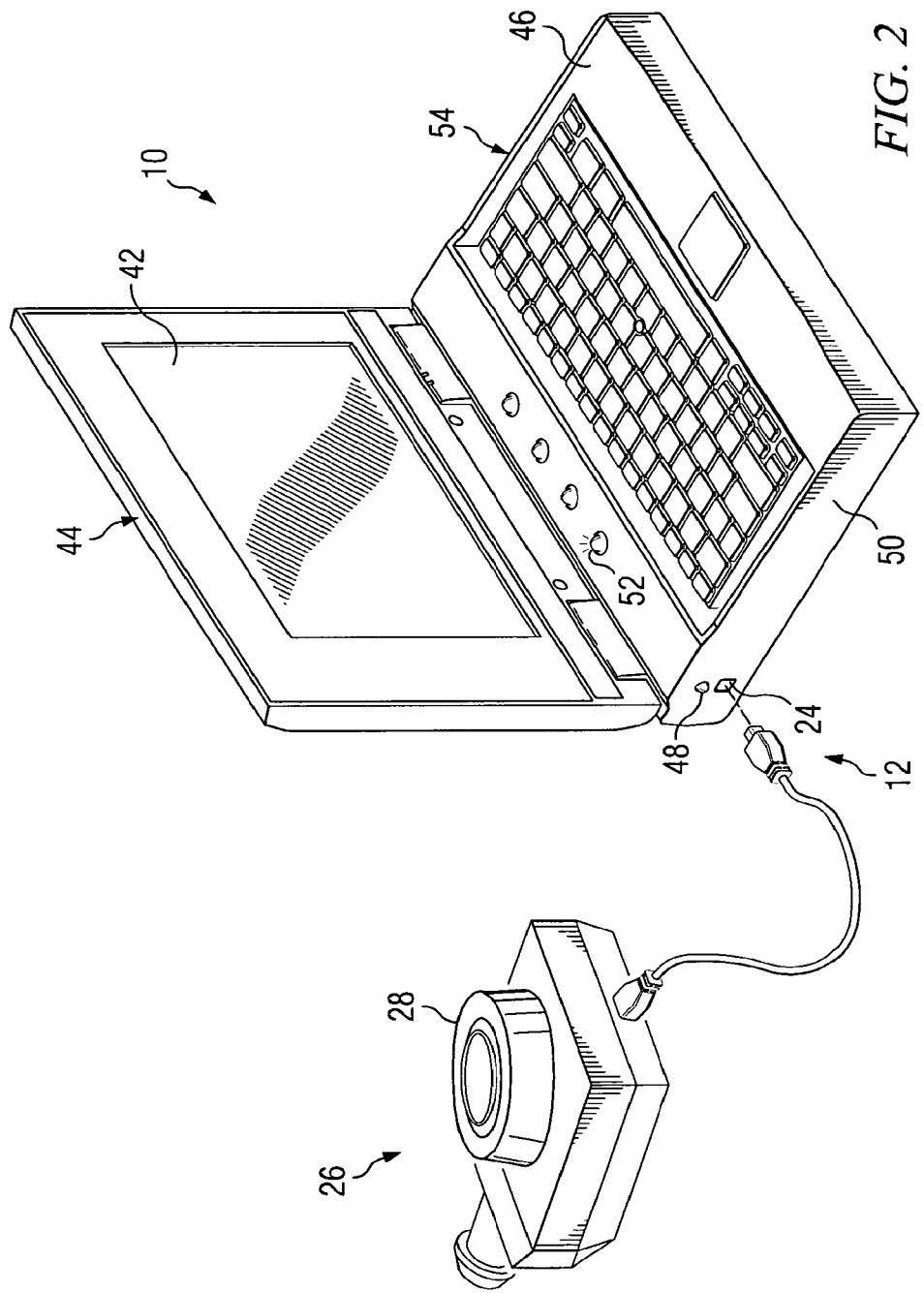
FIG. 2 is a diagram illustrating an embodiment of the computer device of FIG. 1 having an output setting indicator in accordance with the present invention.
Figure 3:
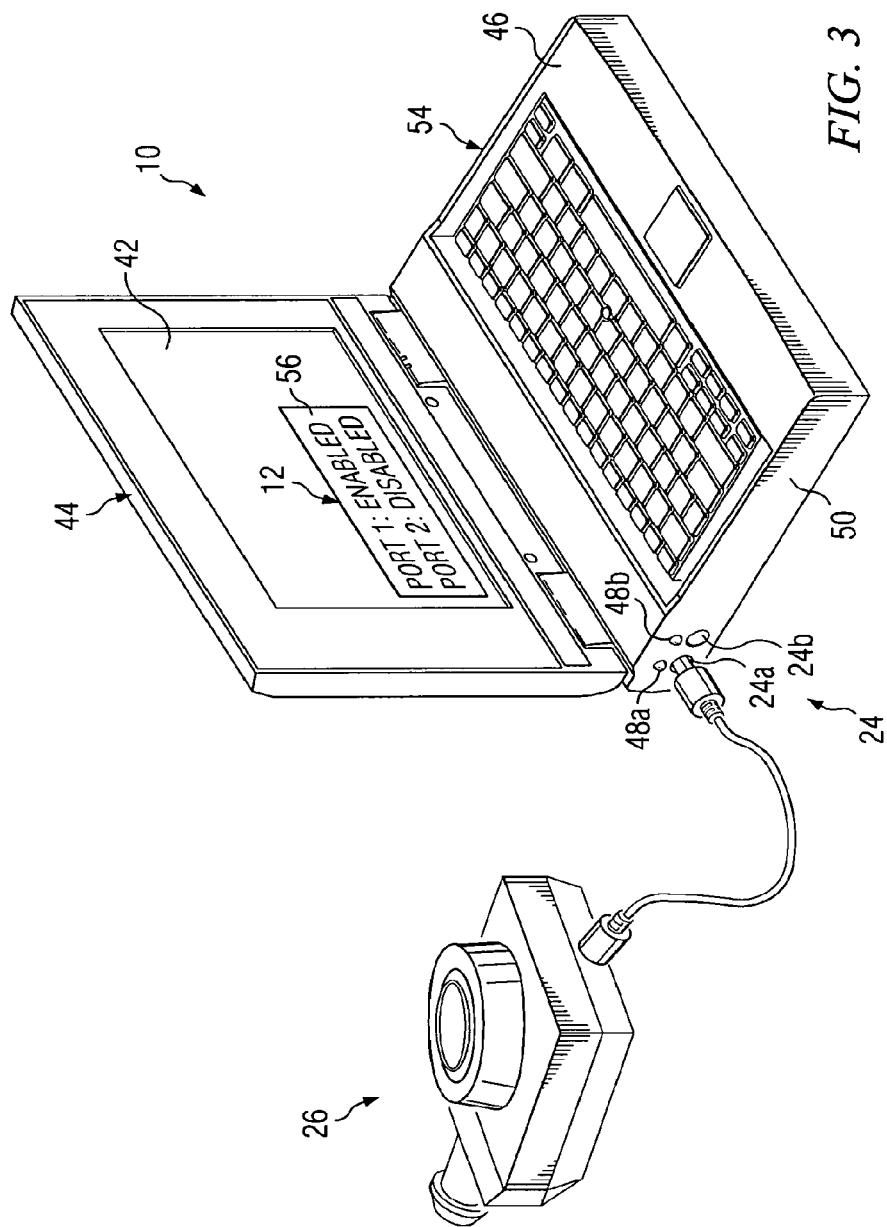
FIG. 3 is a diagram illustrating another embodiment of the computer device of FIG. 1 having an output setting indicator in accordance with the present invention.

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of a computer device 10 comprising an output setting indicator 12 in accordance with the present invention. Computer device 10 may comprise any type of computer device such as, but not limited to, a desktop personal computer, tablet personal computer, laptop or notebook computer, a handheld computing device, or any other type of portable or non-portable computer device.

In the embodiment illustrated in FIG. 1, computer device 10 further comprises a processor 16 coupled to a memory 18, connector port(s) 24, a display screen 42 and an audio element 44. In the embodiment illustrated in FIG. 1, connector port(s) 24 are communicatively coupled to external device(s) 26. In the illustrated embodiment, external device(s) 26 comprise a projector 28 for visually displaying output from computer device 10 and attachable speaker(s) 27 for providing audio output from computer device 10. However, it should be understood that external device(s) 26 may comprise any other type of device capable of receiving an output from computer device 10 and/or inputting information to computer device 10, such as, but not limited to, a monitor, printer, disk drive, modem, scanner or keyboard. Display screen 42 may comprise any type of display element for displaying visual content to a user such as, but not limited to, a liquid crystal display (LCD). Audio element 44 comprises any type of audio component of computer device 10 for providing an audio output such as, but not limited to, a speaker. It should be understood that computer device 10 may be manufactured having other and/or additional components.

In the embodiment illustrated in FIG. 1, computer device 10 comprises an output monitor 30. Output monitor 30 may comprise software, hardware, or a combination of software and hardware. In FIG. 1, output monitor 30 is illustrated as being stored in memory 18 so as to be accessible and executable by processor 16. However, it should be understood that output monitor 30 may be otherwise located or stored. In the embodiment illustrated in FIG. 1, computer device 10 comprises output configuration setting(s) 34. Output configuration setting(s) 34 comprise information and/or setting(s) for controlling an output of content by device 10 (e.g., audio and/or visual content). In the embodiment illustrated in FIG. 1, output configuration setting(s) 34 comprise an external output setting 36 (e.g., outputting content of application 32 only to external device(s) 26), an internal output setting 38 (e.g., outputting content of application 32 only to internal devices of computer device 10 (e.g., devices contained on and/or otherwise forming a part of computer device 10) such as display screen 42 and/or audio element 44) and an external/internal output setting 40 (e.g., outputting content of application 32 to both external device(s) 26 and internal device(s) of computer device 10, such as display screen 42 and/or audio element 44). However, it should be understood that other output setting(s) 34 may be configured (e.g., for different types of applications, different types of data content and/or different types of external devices 26).

Output monitor 30 detects and/or otherwise determines a particular output configuration setting 34 selected and/or otherwise configured, either by a user or as a default selection, for presenting and/or otherwise outputting content by computer device 10. Based on the particular output configuration setting 34 of device 10, output monitor 30 actuates output setting indicator 12 corresponding to the selected output configuration setting 34. In some embodiments of the present invention, output monitor 30 is configured to actuate output setting indicator 12 for a particular type of configuration setting 34. For example, in some embodiments of the present invention, output monitor 30 is configured to actuate a particular output setting indicator 12 only for configuration settings 34 transmitting output to external device(s) 26. Thus, in the above example, if external output setting 36 or external/internal output setting 40 is selected and/or enabled, output monitor 30 actuates output setting indicator 12, thereby indicating to a user that content will be output by computer device 10 at least through connector port 24 to external device(s) 26. In other embodiments of the present invention, output monitor 30 is configured to actuate a particular output setting indicator 12 for each available configuration setting 34 (e.g., a particular indicator 12 for external output setting 36, another indicator 12 for internal output setting 38, etc.) In some embodiments of the present invention, output setting indicator 12 is used to visually indicate the particular output configuration setting 34. However, it should be understood that output setting indicator 12 may comprise other types of devices or elements for providing different types of indications (e.g., audio, a combination of audio and visual, etc.).

FIG. 2 is a diagram illustrating an embodiment of computer device 10 with output setting indicator 12 in accordance with the present invention. In the embodiment illustrated in FIG. 2, computer device 10 comprises a laptop or notebook computer having a display member 44 rotatably coupled to a base member 46. In the embodiment illustrated in FIG. 2, output setting indicator 12 comprises a light source 48 (e.g., a light emitting diode (LED)) disposed adjacent to connector port 24 on a side surface 50 of base member 46 to visually indicate selection a particular output configuration setting 34. Preferably, light source 48 is located near a particular connector port 24 that is enabled and/or otherwise configured to be used for content output based on the particular output configuration setting 34, thereby visually indicating to the user the particular connector port 24 enabled for the content output (e.g., by illuminating light source 48). However, it should be understood that light source 48 may be otherwise located (e.g., any location on base member 46 or display member 44). Further, it should be understood that output setting indicator 12 may comprise other types of indicators configured to visually indicate a particular output configuration setting 34 and/or connect port 24 enabled. It should be understood that non-illumination of light source 48 may also be used as an indication of either an enabled or non-enabled status of a particular connector port 24.

Thus, in the embodiment illustrated in FIG. 2, for example, if output configuration settings 34 are selected that will use and/or otherwise enable connector port 24 for content output, output monitor 30 causes illumination of light source 48, thereby visually indicating to a user that data content will be output through the particular connector port 24 associated with light source 48. Thus, for example, if either external output setting 36 or external/internal output setting 40 is selected, output monitor 30 causes illumination of light source 48.

Embodiments of the present invention may also be configured to utilize a variety of methods of output setting indicator 12 actuation. For example, in some embodiments of the present invention, light source 48 is configured to blink to indicate an enabled status of connector port 24 for output of content for a particular configuration setting 34. In other embodiments of the present invention, output setting indicator 12 comprises a multi-color light source 48 to indicate an enabled status of connector port 24 for outputting content (e.g., a green light indicating connector port 24 is enabled based on a particular configuration setting 34 and a red light indicating that connector port 24 is not enabled for a particular configuration setting 34). Thus, in the above example, light source 48 would be illuminated green for output settings 36 and 40 and illuminated red for setting 38.

In other embodiments of the present invention, output setting indicator 12 is configured for operation as part of, or in combination with, a multi-purpose light source 52 (e.g., an LED). For example, multi-purpose light source 52 may be used for other purposes such as, but not limited to, indicating whether computer device 10 is powered on or powered off. Thus, in this embodiment of the present invention, light source 52 may be configured to blink to indicate an enabled status of a particular connector port 24 for a particular configuration setting 34, be configured as a multi-color light source 52 having a particular color for indicating an enabled status of connector port 24 for different configuration settings 34, or otherwise. In the embodiment illustrated in FIG. 2, multi-purpose light source 52 is disposed on a working surface 54 of base member 46. However, it should be understood that multi-purpose light source 52 may be otherwise located on computer device 10 (e.g., any location on base member 46 and/or display member 44).

In yet other embodiments of the present invention, output setting indicator 12 is configured to display an indication of each selectable output configuration setting 34. For example, in some embodiments of the present invention, output setting indicator 12 comprises a plurality of light sources 48 each corresponding to a different output configuration setting 34 (e.g., one light source 48 for external output setting 36, another light source 48 for display screen output setting 38, and yet another light source 48 for display screen/external output setting 40). In other embodiments of the present invention, a multi-color light source 48 may be used such that a different color is illuminated for each different configuration setting 34.

FIG. 3 is a diagram illustrating another embodiment of computer device 10 having output setting indicator 12 in accordance with the present invention. In the embodiment illustrated in FIG. 3, output setting indicator 12 comprises a display element 56 displayable on display screen 42 of computer device 10 to indicate a particular selected output configuration setting 34. Display element 56 may comprise a pop-up window, icon or other type of graphical indicator presented on display screen 42 of computer device 10 to indicate the selected output configuration setting 34. For example, in some embodiments of the present invention, display element 56 is used to visually indicate to a user selection of one of settings 36, 38 or 40 (e.g., a textual display or otherwise). In other embodiments of the present invention, display element 56 is used to visually indicate an enabled status of a particular connector port 24 that will be used to output content for a particular configuration setting 34. For example, in the embodiment illustrated in FIG. 3, computer device 10 comprises two connector ports 24a and 24b. In some embodiments of the present invention, output monitor 30 uses display element 56 to display to the user that particular connector port 24a and/or 24b enabled for content output for a particular configuration setting 34.

In other embodiments of the present invention, computer device comprises an output setting indicator 12 associated with each or particular connector ports 24. For example, in the embodiment illustrated in FIG. 3, output setting indicator 12 comprises light sources 48a and 48b located near and/or otherwise associated with respective connector ports 24a and 24b. In operation, output monitor 30 (FIG. 1) causes illumination of a particular light source 48a and/or 48b as being enabled for content output based on a particular configuration setting 34. For example, if a particular configuration setting 34 is set to use connector port 24a for output of content, output monitor 30 causes illumination of light source 48a associated therewith, thereby providing a user with a visual indication of the particular connector port 24 enabled for content output for a particular output configuration setting 34. Thus, embodiments of the present invention provide an indication enabling a user to easily identify that a particular connector port 24 is enabled for content output for a particular output configuration setting 34.

Thus, embodiments of the present invention provide an output setting indicator 12 to provide a user with an indication that a particular connector port 24 is enabled and/or otherwise selected as an output port for a particular configuration setting 34. Thus, embodiments of the present invention enable a user to easily identify a particular connector port 24 to connect an external device 26 thereto for obtaining an output of content on such external device 26. Embodiments of the present invention also provide a user with an indication that a particular connector port 24 is enabled and/or otherwise selected as an output port for a particular configuration setting 34 to enable the user to easily change the configuration setting 34 and obtain a confirmation that the connector port 24 to which a particular external device 26 is connected has been enabled for content output (e.g., by a visually illuminated element or otherwise).

What is claimed is:

1. A notebook computer, comprising:
 a display screen;
 a connector port located on a base of the notebook computer;
 an output setting indicator configured to display on the display screen; and
 an output monitor configured to determine which of a plurality of output configuration settings of the notebook computer is selected, and to actuate the output setting indicator corresponding to the selected output configuration setting, wherein a first of the plurality of output configuration settings specifies that content is to be output from the notebook computer, and a second of the plurality of output configuration settings specifies that content is not to be output from the notebook computer, wherein the output setting indicator visually indicates that the connector port is enabled for communicating data with an external device through the connector port in response to the first output configuration setting being selected, and visually indicates that the connector port is not enabled for communicating data with the external device through the connector port in response to the second output configuration setting being selected.

2. The notebook computer of claim 1, wherein the output setting indicator is a pop-up window presented on the display screen.

3. The notebook computer of claim 1, wherein the output setting indicator is an icon presented on the display screen.

4. The notebook computer of claim 1 further comprising another connector port, wherein the output setting indicator indicates on the display screen when the connector port and the another connector port are enabled and disabled for communicating data with corresponding external devices.

5. A computer device comprising:
 a display screen;
 a connector port located on an external surface of the computer device;
 an output setting indicator configured to display on the display screen; and
 an output monitor configured to determine which of a plurality of output configuration settings of the computer device is selected, and to actuate the output setting indicator corresponding to the selected output configuration setting, wherein a first of the plurality of output configuration settings specifies that content is to be output from the computer device, and a second of the plurality of output configuration settings specifies that content is not to be output from the computer device, wherein the output setting indicator displays an indication on the display screen indicating that the connector port is enabled for communicating data with an external device through the connector port in response to the first output configuration setting being selected, and indicating that the connector port is disabled for communicating data with the external device through the connector port in response to the second output configuration setting being selected.

6. The computer device of claim 5, wherein the indication on the display screen includes text stating that the connector port is enabled or text stating that the connector port is disabled.

7. The computer device of claim 6, wherein the indication on the display screen includes a graphical indicator.

8. The computer device of claim 6 further comprising a light emitting diode (LED), wherein the LED is located adjacent the connector port and illuminates when the connector port is enabled for communicating data with the external device.

9. A method executed by a computer device, comprising:
 detecting, by the computer device, which of a plurality of output configuration settings of the computer device is selected, wherein a first of the plurality of output configuration settings specifies that content is to be output from the computer device, and a second of the plurality of output configuration settings specifies that content is not to be output from the computer device; and
 visually indicating with a visual indicator on a display screen of the computer device that the connector port is enabled for communicating data with an external device through the connector port in response to the first output configuration setting being selected, and that the connector port is not enabled for communicating data with the external device through the connector port in response to the second output configuration setting being selected.

10. The method of claim 9 further comprising, displaying text on the display screen to indicate when the connector port is enabled and when the connector port is not enabled.

11. The method of claim 9 further comprising, displaying a pop-up window including the visual indicator on the display screen to indicate when the connector port is enabled and when the connector port is not enabled.

* * * * *